(12) United States Patent
Martinez

(10) Patent No.: US 7,174,313 B1
(45) Date of Patent: Feb. 6, 2007

(54) PORTFOLIO REBALANCING SYSTEM

(75) Inventor: Edmund Martinez, Skillman, NJ (US)

(73) Assignee: Merrill, Lynch, Pierce, Fenner & Smith, New York, NY (US)

( * ) Notice: Subject to any disclaimer, the term of this patent is extended or adjusted under 35 U.S.C. 154(b) by 0 days.

(21) Appl. No.: 09/262,716

(22) Filed: Mar. 4, 1999

(51) Int. Cl.
*G06Q 40/00* (2006.01)

(52) U.S. Cl. .................................. 705/36 R

(58) Field of Classification Search ............... 705/36, 705/35, 36 R, 37–40
See application file for complete search history.

(56) References Cited

U.S. PATENT DOCUMENTS

| | | | |
|---|---|---|---|
| 5,189,238 A * | 2/1993 | Hayakawa | 84/609 |
| 5,517,406 A * | 5/1996 | Harris et al. | 705/30 |
| 5,761,442 A * | 6/1998 | Barr et al. | 705/36 R |
| 6,018,722 A * | 1/2000 | Ray et al. | 705/36 R |
| 6,154,732 A * | 11/2000 | Tarbox | 705/36 R |

FOREIGN PATENT DOCUMENTS

EP 401203 A2 * 12/1990
EP 573991 A1 * 12/1993

OTHER PUBLICATIONS

Sep. 1998, Canada NewsWire, "Regular Portfolio Rebalancing Can Reduce Impact of Market Volatility", p. 1.*
Kaye et al., 1998,U.S. News & World Report, "1998 Retirement Guide", p. 75.*
Goal Manager Handbook, May 7, 1997, 18 pages, U.S.
Goal Manager Phase II Release Details, Mar. 20, 1998 10 pages, U.S.
Project Requirements and Design—Goal Manager Phase II, Mar. 20, 1998, 34 pages, U.S.
Systems Requirements—Asset Allocation, 21 pages, U.S.

* cited by examiner

*Primary Examiner*—Vincent Millin
*Assistant Examiner*—Olabode Akintola
(74) *Attorney, Agent, or Firm*—Morgan, Lewis & Bockius LLP; Steven D. Underwood

(57) ABSTRACT

Described herein is method of managing an investment portfolio having a plurality of investment funds, said managing method comprising establishing an allocation of assets among said investment funds and rebalancing said investment funds substantially back to said allocation on a periodic basis. Also described is a method wherein the rebalancing back to the allocation is initiated in response to a transaction, such as a withdrawal loan issue, or change in allocation, in one or more of the funds.

8 Claims, 5 Drawing Sheets

PORTFOLIO REBALANCING SYSTEM

BACKGROUND OF THE INVENTION

1. Field of the Invention

This invention relates to data processing systems for managing investment accounts. More particularly, the present invention relates to systems and methods to implement an investment portfolio rebalancing system.

2. Description of the Related Art

Modern portfolio theory is based on diversification. Investment funds are selectively distributed across a spectrum of investments of varying risk. The primary purpose of diversification is to manage risk. Young investors looking for high returns at high risk will generally allocate a larger portion of their portfolio to growth and international stocks while older and more prudent investors will favor bonds and blue-chip stocks. This requires that the investments be carefully monitored, however, because market fluctuations will change the initial allocation over time and therefore cause the investor to be invested in a risk category to a degree that he may no longer be comfortable with.

In general, three risk allocation strategies are in widespread use and are usually referred to as "Buy and Hold", "Constant Mix", and "Constant Proportion" strategies. In the "Buy and Hold" schema, investments are made and the investor holds on to them for the long term. In the "Constant Mix" scenario, the investor determines what the asset allocation will be and periodically adjusts his portfolio accordingly by selling and buying in his investments to as to rebalance back to the original allocation. In the "Constant Proportion" strategy, the investor establishes a floor value for the portfolio (the minimum value that the portfolio will be permitted to fall to) and also establishes a constant that determines the level of investment in the high-risk investments (usually stocks).

In addition to spreading risk, most investors would or should follow the adage to "buy low and sell high." In actual practice, few have the discipline to sell off investments when they are riding high or to buy into investments when they are low.

A need therefore exists for an automated process that addresses both the desire of the investor to maintain his risk allocation among risk groups as well as the need to sell investments after they have increased in value and to buy investments after they have fallen in value.

BRIEF SUMMARY OF THE INVENTION

Disclosed herein is a method of managing an investment portfolio wherein the portfolio comprises a plurality of investment accounts, or funds. An initial allocation percentage of assets to each fund in the portfolio is established and the assets distributed accordingly. At periodic intervals the portfolio is valued and the funds are then rebalanced by selling off the best performing funds and using the proceeds to purchase pro rata the worst performing funds so as to bring the total portfolio back to the initial allocation. Alternatively, the system can be set up to trigger a rebalance whenever the portfolio deviates from the allocation by a predetermined threshold amount.

It is an object of the invention to provide a system wherein numerous investors may allocate their risk among their portfolio investments in an automated manner.

It is an object of this invention to provide a means for numerous investors to reallocate assets in a portfolio from the best performing investments to the worst performing investments in an automated fashion that does not require constant supervision by the investors.

It is an object of this invention to also provide, under certain circumstances, a means to adjust balances back to the intended allocation whenever the investor makes a transaction, such as withdrawal, deposit, issue loan, or model change to his accounts, that would disturb the intended allocation of assets among the investments.

DETAILED DESCRIPTION OF THE INVENTION

Figure 1:
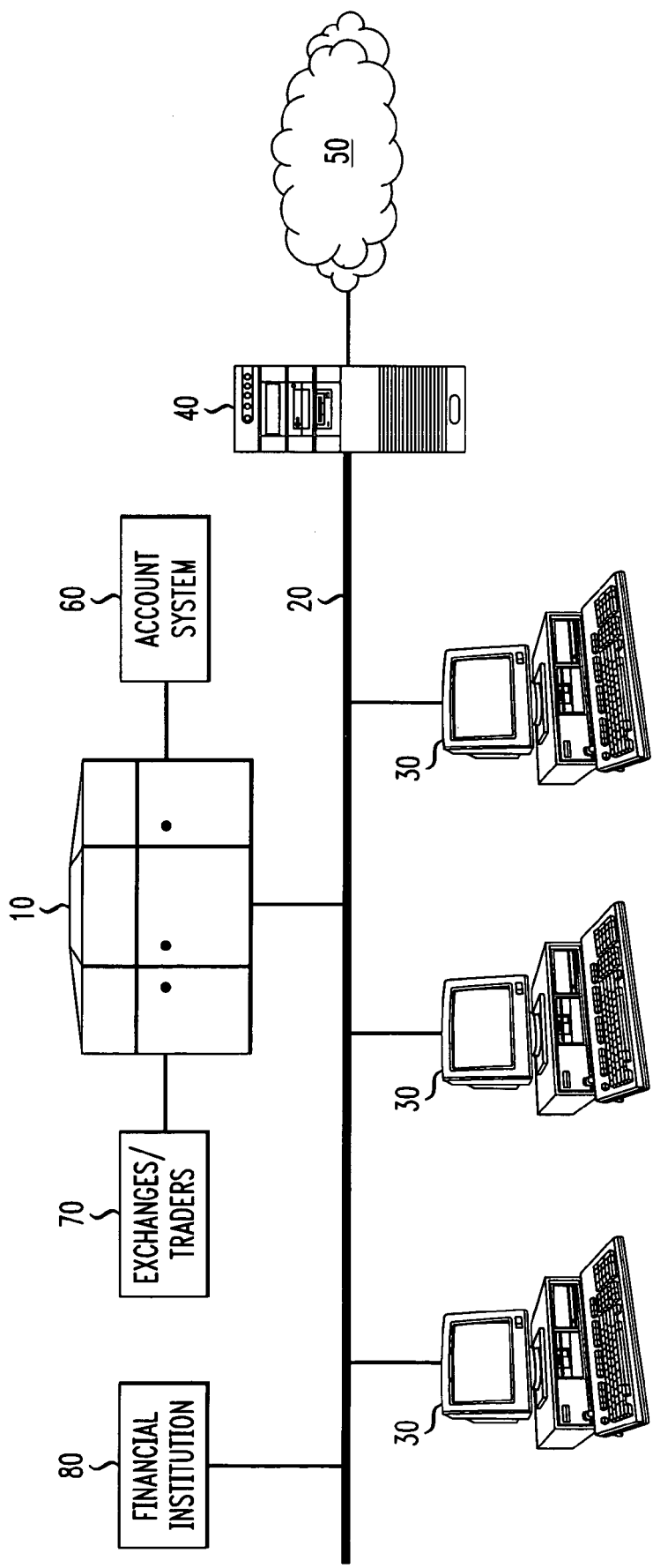
FIG. 1 is an exemplary schematic of a network with which the invention may be executed.

Disclosed herein is a method of managing investment portfolios and a data processing system for doing so. The method comprises the establishment of an initial asset allocation among the various investments in a portfolio. The portfolio is then rebalanced back to the original allocation proportions on a periodic or threshold basis. The invention is particularly useful for investment portfolios held for the long-term, such as 401(k) plans and the like, and throughout this disclosure the term "fund" will be used to refer to the investments as a convenience, though it is to be understood that this invention is not limited to 401(k) nor any other retirement plans, nor is the invention to be construed as limited to mutual fund investments. It is foreseen that the invention will be utilized by a financial institution (e.g., an investment firm, bank, or the like) that will act as the Plan Provider on behalf of its client Plan Sponsors (e.g., a business) for the benefit of the Plan Participants (e.g., the business' employees), though certainly other arrangements may be structured. The allocation is by no means fixed, but rather it is preferred that either the Plan Provider, Plan Sponsor, or Plan Participant may set or change it in accordance with agreement, and the system will rebalance accordingly.

In a preferred embodiment of the invention, the Plan Participants in the plan are offered various portfolio plans as investment options. For example, a Plan Provider utilizing the teachings herein could offer Discretionary, Plan-Level, or Participant-Level versions to each Plan Sponsor. The Discretionary option would give discretionary power to the Plan Provider to formulate allocation models, the Plan-Level option would give the Plan Sponsor that responsibility, while the Participant-Level option allows each individual investor to formulate their own allocation model.

By "model" is meant the overall structure of the portfolio and the parameters by which it is managed, which may include, and is not limited to, the funds themselves, the percentage amount of each contribution to the investor's funds that are to be diverted to the system of this invention, the percentages of said diverted contributions to be initially allocated to each individual fund, the frequency with which the funds will be rebalanced, and the degree of deviation from the allocation needed to trigger a rebalancing, and any other parameters needed to manage a particular Plan Participant's investment plan.

It is anticipated that many Participants will want to also invest in traditional portfolios and not have all their assets invested in the rebalancing system of this invention. It is preferred that any individual investor have the option of investing all or only a portion of his contributions into the rebalancing portfolio. For example, if the investor is invested in three mutual funds, he can decide to have 40% of all his contributions diverted to the rebalancing system with 10% of that amount to the first fund, 20% to the second, and 70% to the third, and the remaining 60% to his other non-rebalanced investments. Hence, for a $1,000.00 contribution, $40.00 will go into the first fund, $80.00 into the second, $280.00 into the third, (totaling $400.00, or 40%) under the rebalancing system while $600.00, or 60%, will go into whatever funds he has selected outside the rebalancing system and will not be subject to rebalancing. Preferably, the Participant could designate the 60% in our example to go into any number or kind of funds outside the rebalancing portfolio—he is not restricted to the same funds within the rebalancing portfolio, which is to say that the structure of the investments within the rebalancing portfolio is preferably independent of the structure of the Participant's investments outside the rebalancing portfolio, though some or all funds may be identical.

It is therefore preferred that the Plan Participant be permitted to have rebalanced monies invested in the same funds as non-rebalanced monies. This brings up the question as to how to keep track of which assets invested in any one fund are subject to rebalancing and which are not.

There are at least four options for keeping track of the contributions to each fund that are subject to rebalancing and those that are not subject to rebalancing. The first is simply to create separate accounts for the same funds under different account numbers. A second is to identify assets in each fund according to their source. A third is to program functionality into the system that keeps careful track of the contributions and the positions of each fund. The last is to "mirror" the original funds in separate data structures, keeping the identical account numbers so that it appears to the investor that all the funds remain in the same account. It is discovered that this last approach that will be found to be the easiest to implement, because practitioners of the invention herein will most likely be modifying an existing system rather than building a new one from the ground up. It is found that the "mirror fund approach" requires the least modification to existing recordkeeping systems.

ID numbers are assigned to the mirror funds and the Plan Participant is preferably restricted from transferring assets among the mirror funds. It is preferred that Plan Participants be permitted to transfer assets between and amongst both balanced and nonbalanced funds.

System Architecture

Referring to FIG. 1, a suggested overall system hardware architecture is shown. The main processing components and main data storage of the system are resident on a central computer 10 that is connected to a computer network 20. Preferably, the central computer 10 is comprised of an IBM ES/9000-860 operating at 202.5 with 98 channels and the network 20 is a Novell environment. Of course, other computer and network configurations will work similarly. A plurality of terminals 30 provide access to the network 20 and may comprise standard computer terminals as well as ATM machines and the like. The terminals are within the financial institution that is the Plan Provider for the system. For access to the system by Plan Sponsors and Plan Participants, internet 50 or other outside network access is provided. It is preferred that the network 20 be shielded from the internet 50 by a firewall 40.

The central computer 10 preferably has direct access to the Plan Provider's account system 60 that will hold the actual accounts if the central computer itself is not maintaining them. Also provided is direct access to the NSCC (National Securities Clearing Corporation), stock and commodities exchanges, and/or OTC traders 70 to provide for the trading of funds. These two connections allow for automated account transactions and mutual fund, securities, and commodities trading. Of course, connections may be established to other brokerage services for other types of funds as desired.

It is preferred that there be a link to the Plan Provider's other computer and network systems 80 to provide access to valuable resources, such as pricing data and other information.

The central computer is adapted to execute the methods of the invention herein. Such adaptation usually comprises programming code, but hardware means may also be implemented, particularly for complex mathematical calculations, as is known in the art (e.g., a math coprocessor).

System Data Structures

The system herein preferably comprises a number of data structures. If the mirror approach is adopted, then of course the mirror fund structures will be required. In addition, it is preferred that data structures be established and that they be grouped according to level. Suggested levels of data structures are the Plan Level (PL), the Participant Level (PH), the Fund Level (FL), the Source Level (SC), and the Model Level (ML). Finally, a processing calendar structure described below is a preferred option.

Though the teachings of the invention herein may be executed in any programming language and indeed has been executed in COBOL at one time, it is preferred that structured languages, such as C and C+ be used, because of their adaptation to data structures, though data structures are not required. Object-oriented languages, such as C++, which has also been used to actually execute portions of the invention herein, are also particularly useful in that the various levels may be conveniently executed as objects and a system of inheritance implemented where desired. For the purposes of this disclosure, "data structure" and "object" will be used interchangeably and for simplicity will be construed to further encompass a simple collection or set of variables and their equivalents in non-structured languages.

It is to be understood that the data structures and element names disclosed herein are for illustrative purposes only and are not intended to be construed to limit the scope of the invention.

Model Level

The Model Level is simply a set of variables, data structure, or object that contains the parameters for a model. An exemplary Model Level might include a data structure named ML that contains the following elements or members:

```
struct ML {
    ModelType;
    ModelNameLong;
    ModelNameShort;
    MinimumRebalancePercentFlag;
    MinimumRebalancePercent;
    MinimumRebalanceAbsoluteFlag;
    MinimumRebalanceAbsolute;
    ModelRebalanceFrequency;
    LastChangeDate;
    MinimumEnrollmentBalance;
    struct ModelAllocationPercent {
```

Fund01Code;
Fund01Percent;
Fund02Code;
Fund02 Percent;
Fund03Code;
Fund03Percent;
.
.
.
FundnnCode;
FundnnPercent;
};
};

where nn is the last and maximum fund number, ModelType is a value identifying the model (e.g., Discretionary Plan with quarterly rebalance), ModelNameLong is a full title for the name of the model, ModelNameShort is an abbreviated version of the title for display on a screen or report where space is at a premium, MinimumRebalancePercentFlag is a YES/NO flag indicating whether rebalancing should be based upon percentage variation from the allocation, MinimimRebalancePercent is the actual percentage deviation from the allocation that will trigger the rebalance trade of a specific fund, MinimumRebalanceAbsoluteFlag is a YES/NO flag indicating whether rebalancing should be based upon an absolute dollar amount variation from the allocation, MinimumRebalanceAbsolute is the actual dollar amount deviation that will trigger the rebalance trade of any one fund, ModelRebalanceFrequency is a value indicating the frequency of periodic rebalancing (e.g., annually, semi-annually, quarterly, monthly, etc.), LastChangeDate is a value indicating the last date the allocation was modified, MinimumEnrollmentBalance is a value indicating the minimum total dollar amount invested that is required to remain enrolled in the model, and ModelAllocationPercent is a matrix of data elements identifying each fund by an ID number (e.g., Fund01Code) and the percent allocated to each fund (e.g., Fund03Percent). For more flexibility, one may wish to assign to ModelAllocationPercent a pointer or handle to a linked list of data structures, each having a fund code and percent, so as to avoid the memory waste and limitations of having an explicit number of funds in the data structure.

Not shown in these data structure examples are function elements that may be included in the data structure if one is using advanced languages, such as C+ or C++, that support functions as structure elements.

Plan Level

A typical Plan Level structure might contain the following data elements:

struct PL {
　struct ModelsAvailable {
　　Discretionary;
　　Plan-Level;
　　Participant-Level;
　};
　MaxNumModelChanges;
　DefaultModel;
　RebalanceDefaultFrequency;
　RebalanceConfirmation;
};

where ModelsAvailable is a list of elements for each model potentially offered by the plan and each element (e.g., Discretionary, Plan-Level, Participant-Level) contains a YES/NO value indicating what plans are currently available, MaxNumModelChangesPerYear is a value indicating the number of times a Plan Participant could make changes to the model within a given time period, DefaultModel is a value of type ModelType (in ML above) that indicates the model type if no specific model type was chosen, RebalanceDefaultFrequency is a value of type ModelRebalanceFrequency (in ML above) that indicates how often rebalancing occurs, and RebalanceConfirmation is a YES/NO value that indicates whether a printed confirmation of the last rebalance is to be mailed to the Plan Participant and/or Plan Sponsor.

Participant Level

A typical Participant Level structure might contain the following data elements:

struct PH {
　ModelType;
　ModelTerminationDate;
　ContributionToModelPercent;
　YearToDateModelChanges;
　ModelEnrollmentDate;
　FeeAssessedDate;
　FeeCollectedDate;
　FeeBillingOption;
};

where ModelType is as described for ML above, ModelTerminationDate is a value indicating the date the model is to be terminated, ContributionToModelPercent is the percentage of contributions to an investment plan that is to be diverted to the asset rebalancing system of this invention, YearToDateModelChanges is a value indicated how many times the model has been changed (for comparison to MaxNumModelChanges at the Plan Level above), ModelEnrollmentDate is the date the model was selected, FeeAssessedDate stores the date the last billing request was generated, FeeCollectedDate stores the date the last assessed fee was collected, and FeeBillingOption is a value indicating how the fee is to be billed (e.g., debit account, send bill by mail, etc.).

Fund Level

A typical Fund Level structure might contain the following data elements:

struct FL {
　ModelFund;
};

where ModelFund is a code identifying a mirrored fund.

Source Level

A typical Source Level structure might contain the following data elements:

struct SC {
　SourceID;
　SourceAvailable;
};

where SourceID identifies the source and SourceAvailable is a YES/NO value indicating whether the source of the contribution for which the structure applies is available for diversion into the asset balancing system.

Processing Calendars

A simple embodiment of the invention herein could have a single global processing calendar. In a most preferred embodiment, however, each model is associated with a processing calendar. The calendar should be accessible to the plan team and will be used to initiate the rebalance procedure at periodic intervals.

System Transactions

Contribution Procedure

Incoming contributions to a Plan Participant's plan may originate from the Plan Participant himself, the Plan Sponsor (e.g., matching contributions to a 401(k) plan), or other source. The system should only divert contributions from allowable sources. An instance of the data structure SC is preferably associated with all possible sources so that the element SC.SourceAvailable can be checked to see if the source is eligible.

Figure 2A:
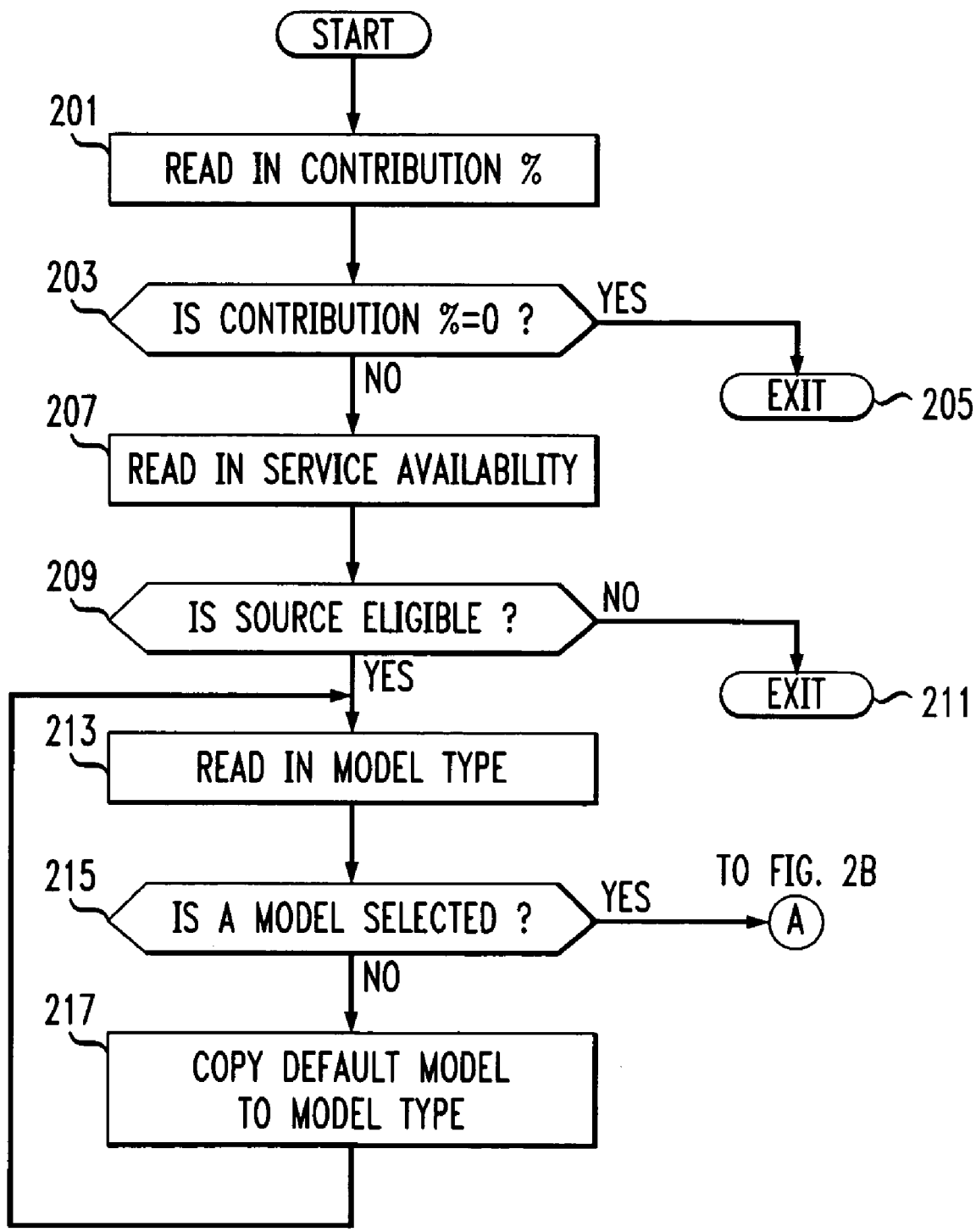
FIGS. 2A and 2B together comprise a schematic of an embodiment of the Contribution Procedure of the invention.
Figure 2B:
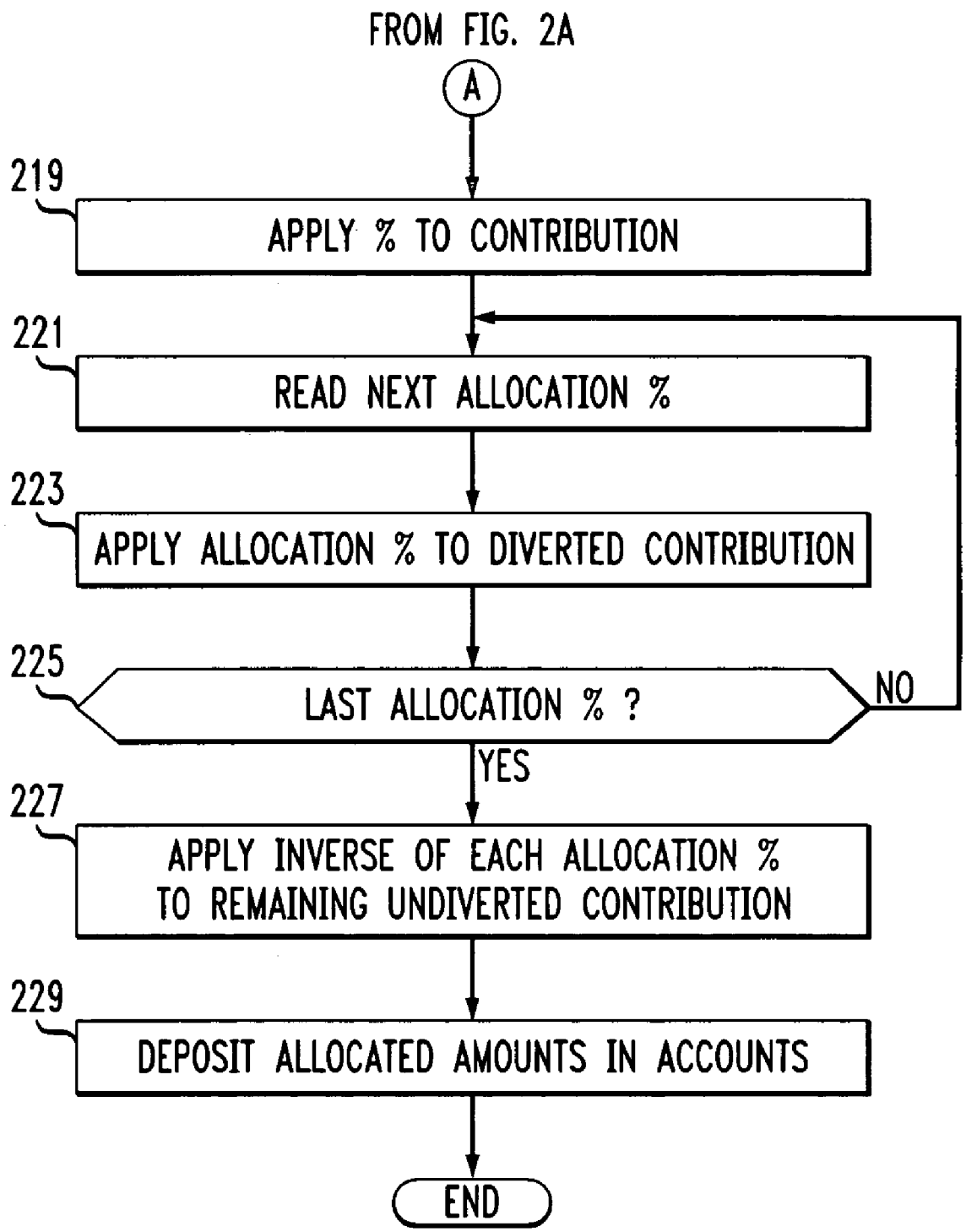

Referring to FIGS. 2A and 2B, a typical contribution procedure could operate as follows, though the exact order of steps is not critical:

First, at block 201, the system reads in the percentage of the contribution to be diverted from PH.ContributionToModelPercent. If this value is zero, at determined at block 203, then the procedure exits (block 205).

Second, at block 207, read in SC.SourceAvailable is read and a test is performed at block 209 to see if the contribution source is eligible. If not, then exit (block 211).

Third, check to see if a model type has been selected. In our example, the system would read the value ML.ModelType (block 213). If this value is null, signifying that a model type has not been selected, as determined at block 215, then the default model type specified in PL.DefaultModel is read in and written to ML.ModelType (block 217).

Fourth, apply the value in PH.ContributionToModelPercent to the contribution (block 219) and then apply the diverted contribution to the ML.ModelAllocation matrix by reading in each ML.FundnnPercent value (block 221) and applying it to the diverted contribution for all nn funds (block 223).

After the last allocation % is read (block 225), the inverse (e.g., 100-FundnnPercent) of each ML.FundnnPercent is applied to the remaining undiverted contribution (block 227) and the results allocated to the regular accounts (block 229).

Rebalancing Procedure

The rebalancing procedure may be subdivided into three broad processes executed in sequence, namely Initiation, Assessment, and Execution.

In the preferred embodiment, Initiation is via a processing calendar or through unscheduled rebalancing, the latter described more fully below. A processing calendar is preferably provided for each model and will determine the frequency at which the model will be rebalanced (e.g., monthly, quarterly, annually, etc.). The processing calendar triggers the rebalancing procedure on the dates and times specified in the calendar. The rebalance frequency will generally be determined by the model the Plan Participant chooses if the user of the invention has chosen the more preferred method of associating a processing calendar with each model or model type. For large plans having many Plan Participants and/or for slow computer systems, it is generally preferred that the processing calendars set the rebalance to occur on the last business day of the week so as to allow the entire weekend to run the rebalancing process.

If the plan is small enough, one may wish to do away with the calendar and simply assess all the accounts on a daily or weekly basis to determine if any of the balances of the funds in each account have significantly deviated from the allocation. Note, however, that such a method consumes a substantial amount of processing time.

Figure 3A:
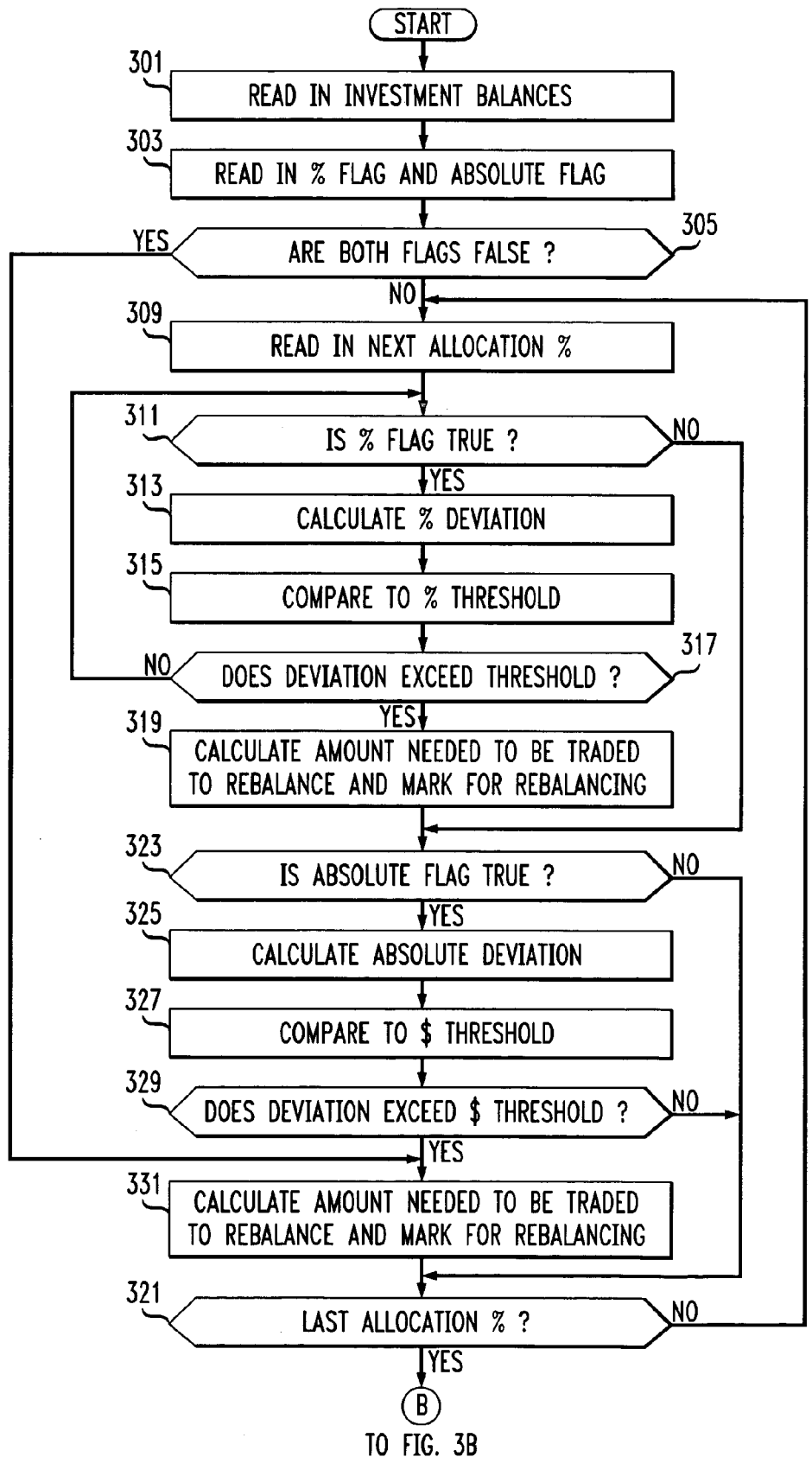
FIGS. 3A and 3B together comprise a schematic of an embodiment of the Rebalancing Procedure of the invention.
Figure 3B:
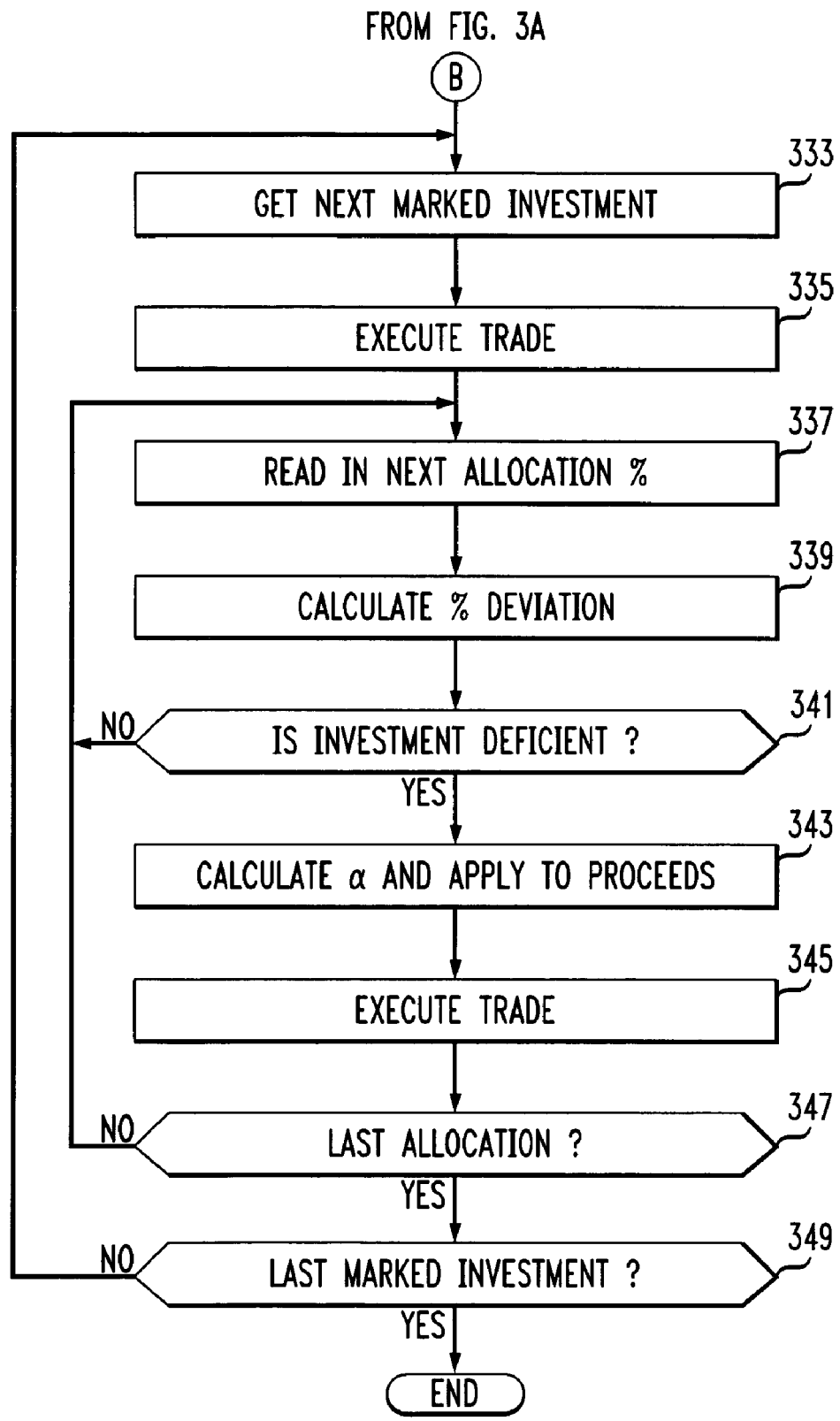

Referring to FIGS. 3A and 3B, when a rebalance is initiated the system executes the following procedure, though the steps shown below need not be executed in the precise order shown to achieve the benefits of the invention. Steps 1 through 3 represent the Assessment phase that determines whether the Plan Participant's account needs to be rebalanced:

1. The values of all funds that are in the Plan Participant's rebalancing plan are read in from memory storage (block 301).

2. Second, the system examines the flags ML.MinimumRebalancePercentFlag at the Model Level and ML.MinimumRebalanceAbsoluteFlag (block 303) to determine if it will be comparing percentages, or absolute values, or both, or neither (block 305). If either is set to True, then the allocation values in ML.ModelAllocationPercent matrix are read in (block 309). If neither is set to True, then the system is rebalanced without regard to threshold and the system jumps to Step 4, below, shown in FIG. 3 as block 319.

3a. If the percent flag is true, as determined at block 311, then the percent deviation of the fund balances from the allocation are calculated (block 313). The system also reads in the ML.MinimumRebalancePercent value and determines which funds, if any, have deviated from the allocation by more than the percentage value stored there (block 315).

3b. If the absolute flag is true, the affirmative branch from block 323 to block 325 is followed where the absolute dollar difference of the funds from the allocation are calculated. The system then reads in the dollar value at ML.MinimumRebalanceAbsolute (block 327) and determines which funds, if any, have deviated from the allocation by more than the absolute dollar value stored there (block 329).

If the assessment finds any fund to exceed the threshold requirement, then:

4. The dollar amounts that need to be bought or sold to bring the funds back in balance are then calculated (block 331).

5. After the last allocation % is considered at block 321, trading orders are generated at blocks 333 and 335 to sell off the excess in the accounts that were found to be in excess of the allocation, (blocks 337 and 339) and to buy into the accounts that were found to be depleted in relation to the allocation, so as to bring the accounts back into balance with the allocation.

In the preferred embodiment, all the funds out of balance will be traded if any one fund exceeds the threshold requirement of percentage and/or absolute dollar amount in step 3a and/or 3b. It should be noted here that by "exceeding" the threshold requirement, we are not just speaking of funds that are above (i.e., in excess of) the allocation, but those that are below (i.e., deficient) as well. Hence, we are comparing the absolute value of the deviation from the allocation for threshold purposes.

At block 341, after identifying the funds in excess of the threshold requirement, it becomes necessary to calculate how the proceeds of the sales of the funds in excess of the allocation are to be distributed among the deficient funds (i.e., those below the allocation). In a preferred embodiment, the excess dollar value of each fund in excess of the allocation is sold off and the proceeds distributed pro-rata among the deficient funds to bring them back toward the allocation. It is preferred that the funds be brought substantially all the way back to the allocation, though an approximation to the original allocation may be commercially acceptable in some situations. One way to do this is to first calculate the actual dollar deficiency $D_n$ of each nth deficient fund for all N deficient funds. One may then calculate an investment factor by dividing this value by the total deficiency as follows:

$$\alpha_n = D_n/(D_1 + D_2 + \ldots D_N) \quad \text{Equation 1}$$

where $\alpha_n$ is the investment factor for the $n^{th}$ deficient fund. This factor can then multiplied by the proceeds of the sale of any of the funds in excess to arrive at the pro-rata amount to be purchased in the deficient fund (block 343). This is convenient because it allows the proceeds to be distributed as each fund in excess is sold off (blocks 345, 347, and 349) rather than having to wait for all sales to be executed before reinvesting the monies.

Of course, the system could be operated in reverse, meaning that the deficient funds are bought into and an analog of Equation 1 used to calculate a liquidation factor $\beta_m$ for each $m^{th}$ fund in excess:

$$\beta_m = E_m/(E_1 + E_2 + \ldots E_M) \quad \text{Equation 2}$$

where M is the total number of funds in excess of the allocation and $E_m$ is the dollar amount that each $m^{th}$ fund is in excess of the allocation.

Aggregated Trading

In another embodiment of the invention, all the buys and sells calculated as described above are aggregated amongst all the portfolios. That is to say that if rebalancing requires that a number of portfolios are to sell shares in fund A and other portfolios are to buy more fund A, then the system does an accounting to transfer ownership from the sellers to the buyers before actually sending out a trading order to an exchange. The net buys and sells that remain after this reshuffling of ownership are aggregated into blocks of shares and the orders sent to the exchange.

Late-Day Trading Agreement

The teachings of this invention were implemented for use in retirement plans, such as 401(k) plans wherein the funds are mutual funds, though it is to be understood that the invention is limited to neither retirement plans nor mutual funds. Mutual funds may be traded, among other means, by transmitting buy and sell orders to the National Securities Clearing Corporation (NSCC).

Whether mutual funds or otherwise, one problem that arises when pricing the investments for the purposes of assessing whether any one fund exceeds the threshold, is that it is possible for the price of the underlying securities to change from the time the system decides to execute the rebalance to the time the actual rebalancing trades are executed on the exchange. Assuming the processing system works quickly in relation to market fluctuation, this will usually result in only a small disbalance from the allocation after rebalancing. Though business means, however, it is possible to eliminate the disbalance entirely.

The solution is to execute a Late-Day Trading contract with the broker to permit trading at the same prices at which the assessment was made. This is done by permitting a time window within which to trade at a set price. Our contract with NSCC, for example, permits us to trade mutual funds at Thursday's closing NAV until Friday morning at 6:30 AM EST. Hence our system has all Thursday night and early Friday morning to trade mutual funds for assessments made the night before at a non-fluctuating price. Likewise, contracts may be made for the entire weekend so that mutual funds may be traded at Friday's NAV right up until 6:30 AM Monday morning. Fluctuations in the market result in losses or gains on trading that are absorbed or enjoyed by the broker, rather than the Plan Participant.

Fund/Source Method

The contributions to a particular fund may derive from more than one source. For various tax and accounting reasons, it is advantageous to split up funds into numerous sub-funds according to source, each of which may be referred to as a fund/source. In a preferred embodiment of the rebalancing procedure, all of the fund/sources representing the same fund, but different sources, will be assessed by having their individual balances added up to form a total as if they were all in a single fund. If this total is greater than the required threshold requirement, then all fund/sources are sold off for that fund even though one or more of the source sub-funds do not exceed the threshold. The proceeds are reinvested in the deficient funds to bring the model back to the allocation as described above, excepting that the pro-rata distribution will be to fund/sources rather than to funds.

Dividing the funds into fund/sources can be critical to the success of a retirement plan managed using the invention. Sources that may be taken into consideration for this purpose include, but are not limited to, (a) before-tax employee contributions, (b) after-tax employee contributions, (c) before-tax company contributions, (d) after-tax company contributions, (e) company profit-sharing contributions, (f) company money purchase contributions, and (g) employee repayments on loans against retirement funds.

It is desirable that the Plan Sponsor and/or Plan Participant be able to treat each fund/source as though it were a separate fund, excepting that the allocation percentages apply to each fund as a whole rather than each fund/source. That is to say that no changes need be made to the ML.ModelAllocationPercent structure because it is not necessary to have a percent allocation for each source, only for the fund as a whole, though that is certainly an option.

Notice the effect on contributions. Suppose the Plan Participant has elected to divert 40% of his contributions to the rebalance system in which 10% is allocated to Fund01. That means that a contribution of $1,000.00 would result in $40.00 contributed to Fund01. Suppose further that Fund01 is divided into three fund/sources, Fund01/Source01, Fund01/Source02, Fund01/Source03. If the contribution of $1,000.00 is from Source02, then the entire $40.00 goes to Fund01/Source02 and none to the other two fund/sources.

Unscheduled Rebalancing Procedure

It has been found that a significant problem with the system as described is that the funds can be thrown substantially off balance by debits or credits caused whenever a Plan Participant makes a withdrawal, makes a deposit, receives loan issues, or changes his model, among other transactions. This is particularly true when the plan sponsor specifies the liquidation sequence for withdrawals and loans. If funds must be liquidated in a specific order, this may dramatically disturb the existing asset allocation. A substantial deviation from the allocation can then be further aggravated by market forces and the Plan Participant is compelled to wait until the next scheduled rebalance until the imbalance is set right. Dual deviations can be caused by a Plan Participant who borrows against a 401(k), thereby first throwing the system off balance by withdrawing from a fund, and then repays the loan shortly after a rebalance, thereby throwing the system off balance again. This problem has proven to be a major source of complaint among Plan Participants. An obvious solution would be to set the scheduled rebalances to run every week, but this causes a serious drain on system resources.

It is therefore desirable to institute a means of initiating rebalancing on a non-periodic basis that is hereinafter referred to as unscheduled rebalancing. By "unscheduled" it is meant that the rebalancing is initiated by other than the processing calendar, even though the unscheduled rebalancing may in fact be "scheduled" to run on a particular date rather than right away.

In the most preferred embodiment, unscheduled rebalancing is initiated whenever the Plan Sponsor or Plan Participant elects a change in the model or engages in a transaction that changes a portfolio. It is also preferred that the Plan Provider be able to initiate an unscheduled rebalancing at will. It is preferred that unscheduled rebalancings be run at the close of business, Friday, so the system has the entire weekend to execute it. If a scheduled rebalancing is already scheduled for that date, then no unscheduled rebalancing is required. In the preferred embodiment, unscheduled rebalancing will be initiated for every Plan Participant that processed either a (a) withdrawal, (b) loan issue, or (c) model change transaction since the last rebalance. Regular contributions are not included because they are already anticipated by scheduled rebalancing. However, if the funds are in the nature of those in which Plan Participants are in the habit of making "unregular" contributions of varying amounts at unexpected intervals, then such deposits should also be included.

It has been found that instituting a system of unscheduled rebalancing contributes greatly to the popularity and success of the rebalancing system by correcting the unbalancing problems that have received criticism from Plan Participants in the past.

Fees

Fees, where applicable, are calculated on the Participant Level. It is preferred that functions be programmed for calculating fees based on either (a) a flat dollar amount, (b) a percentage of the average daily balance of the funds during the fee period, (c) a capped percentage of the average daily balance, (d) the average number of funds held by the Plan Participant during the fee period, (e) the number of rebalances executed during the fee period, or (f) any combination thereof.

For the Discretionary and Plan Level models, the Plan Sponsor will preferably have the option of having the fees paid by the Plan Participant or absorbing those costs by the plan. A flag variable may be placed in ML to so indicate.

Fund management fees in the Discretionary model need to be reimbursed for fees associated with proprietary mutual funds. Proprietary funds are those offered by the Plan Provider itself.

It is preferred that fees be calculated to at least seven decimal places and that they be executed as overnight batch processes.

EXAMPLE

Plan Participant has three funds in the rebalancing system and has chosen a model wherein the allocations are 50.00%, 25.00%, and 25.00% respectively. Plan Participant has recently received a loan from the Plan Provider and has directed the loan monies to be deposited in the first fund (FUND 01). In his model, the Plan Participant has chosen to rebalance if any fund is 5.00% points over the allocation or if the absolute dollar amount is $2,000.00 or more over allocation.

The following table shows the current market value of the funds in column 2, what the amounts in each fund should be in column 3, and the percent and absolute excess (deficiency) in columns 3 and 4 respectively:

TABLE I

| (1) Fund | (2) Market Value | (3) Allocation | (4) Percent Excess (or Deficiency) | (5) Absolute Excess (or Deficiency) |
|---|---|---|---|---|
| FUND 01 | $8,000.00 | $7,000.00 | 7.14% | $1,000.00 |
| FUND 02 | $4,000.00 | $3,500.00 | 3.57% | $500.00 |
| FUND 03 | $2,000.00 | $3,500.00 | (10.71%) | ($1,500.00) |
| TOTAL | $14,000.00 | | | |

As can be seen, The first two funds are in excess, while the third is deficient. None of the first two funds meet the $2,000.00 absolute dollar amount criterion for rebalance, but the first fund does meet the 5.00% criterion. Hence, the system will sell off the $1,000.00 excess in the first fund and the $500.00 excess in the second fund, and invest the proceeds pro-rata in the deficient funds. Since there is only one deficient fund, FUND 03, the money is invested there.

Here is what the funds look like after the rebalance:

TABLE II

| (1) Fund | (2) Market Value | (3) Allocation | (4) Percent Excess (or Deficiency) | (5) Absolute Excess (or Deficiency) |
|---|---|---|---|---|
| FUND 1 | $7,000.00 | $7,000.00 | 0% | $0.00 |
| FUND 2 | $3,500.00 | $3,500.00 | 0% | $0.00 |
| FUND 3 | $3,500.00 | $3,500.00 | 0% | $0.00 |
| TOTAL | $14,000.00 | | | |

Because the Plan Participant received a loan issue, in the preferred embodiment the rebalancing would occur as an unscheduled rebalancing if there were no rebalancing already scheduled on the processing calendar. If the fund/source method is used, the market values in column 2 represent the sum of the market values of all fund/sources for each fund.

Changes and modifications can be made by those skilled in the art to the embodiments as disclosed herein and such examples, illustrations, and theories are for explanatory purposes and are not intended to limit the scope of the claims.

What is claimed is:

1. A computer-executable method of managing an investment portfolio that includes a plurality of funds, said managing method comprising:
   establishing an original allocation of assets among said funds; and
   rebalancing said funds substantially back to said original allocation on a non-periodic basis,
   wherein at least one of fund buys and fund sells are aggregated so as to effect said rebalancing.

2. The method of claim 1 further comprising:
   rebalancing said funds substantially back to said allocation in response to a transaction in one or more said funds.

3. The method of claim 2 wherein said transaction is a withdrawal or loan issue.

4. The method of claim 2 wherein said transaction is a change in said allocation.

5. The method of claim 1 wherein said funds are further subdivided into one or more fund/sources.

6. The method of claim 1 wherein at least one of fund buys and fund sells for a specified fund are aggregated to generate a consolidated trading order.

7. The method of claim 1 wherein trading executed to effect said rebalancing is implemented under a Late-Day Trading Agreement.

8. The method of claim 1 wherein said funds are mirrors of funds not within said managing method.

* * * * *